(12) United States Patent
Nankou

(10) Patent No.: US 7,186,194 B2
(45) Date of Patent: Mar. 6, 2007

(54) BICYCLE FRONT DERAILLEUR

(75) Inventor: Yoshiaki Nankou, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/257,108

(22) Filed: Oct. 25, 2005

(65) Prior Publication Data

US 2006/0035737 A1 Feb. 16, 2006

Related U.S. Application Data

(62) Division of application No. 10/364,350, filed on Feb. 12, 2003, now Pat. No. 7,081,058.

(51) Int. Cl.
*F16H 61/00* (2006.01)
*B62M 9/12* (2006.01)
*B62M 9/16* (2006.01)

(52) U.S. Cl. .................................................. 474/80

(58) Field of Classification Search ............ 474/78–82, 474/70; 285/15, 112, 373
See application file for complete search history.

(56) References Cited

U.S. PATENT DOCUMENTS

| | | | |
|---|---|---|---|
| 3,730,012 A | 5/1973 | Juy | |
| 4,030,374 A | 6/1977 | Isobe | |
| 4,078,444 A | 3/1978 | Huret | |
| 4,226,130 A | 10/1980 | Isobe | |
| 4,237,743 A | 12/1980 | Nagano | |
| 4,279,172 A | 7/1981 | Nagano et al. | |
| 4,279,605 A | 7/1981 | Egami | |
| 4,479,787 A * | 10/1984 | Bonnard | 474/82 |
| 4,516,961 A | 5/1985 | Coue | |
| 4,586,913 A | 5/1986 | Nagano | |
| 4,604,078 A | 8/1986 | Nagano | |
| 4,756,704 A | 7/1988 | Nagano | |
| 4,778,436 A | 10/1988 | Nagano | |
| 5,037,355 A | 8/1991 | Kobayashi | |
| 5,104,358 A | 4/1992 | Kobayashi | |
| 5,312,301 A | 5/1994 | Kobayashi | |
| 5,496,222 A | 3/1996 | Kojima et al. | |
| 5,620,384 A | 4/1997 | Kojima et al. | |
| 5,624,336 A | 4/1997 | Kojima | |
| 6,234,927 B1 | 5/2001 | Peng | |
| 6,270,124 B1 * | 8/2001 | Nanko | 285/15 |
| 6,641,495 B2 | 11/2003 | Valle | |
| 7,014,584 B2 * | 3/2006 | Nanko et al. | 474/80 |
| 2002/0034996 A1 | 3/2002 | Valle | |

FOREIGN PATENT DOCUMENTS

| | | |
|---|---|---|
| DE | 19605817 A1 | 3/1995 |
| EP | 0 348 977 A2 | 1/1990 |
| FR | 2322512 | 3/1997 |
| JP | 59-21830 B2 | 5/1984 |

* cited by examiner

*Primary Examiner*—Marcus Charles
(74) *Attorney, Agent, or Firm*—Global IP Counselors, LLP

(57) ABSTRACT

A front derailleur has a base member adapted to be coupled to a bicycle frame, a chain guide, first and second pivotal links coupled between the base member and the chain guide, and a biasing member normally biasing the chain guide toward a first position. The biasing member is disposed on a pivot axis pivotally coupling the first link to the chain guide to be at least partially located in front of the part of the first link coupled to the base member. The first link is preferably an inner link located closer to the frame than the second link. Preferably, portions of the first link are at least partially offset due to a transitional portion arranged between them. Preferably, the second link includes a cable attachment portion and a pair of axially spaced mounting elements pivotally coupled to ends of an attachment element of the base member.

20 Claims, 10 Drawing Sheets

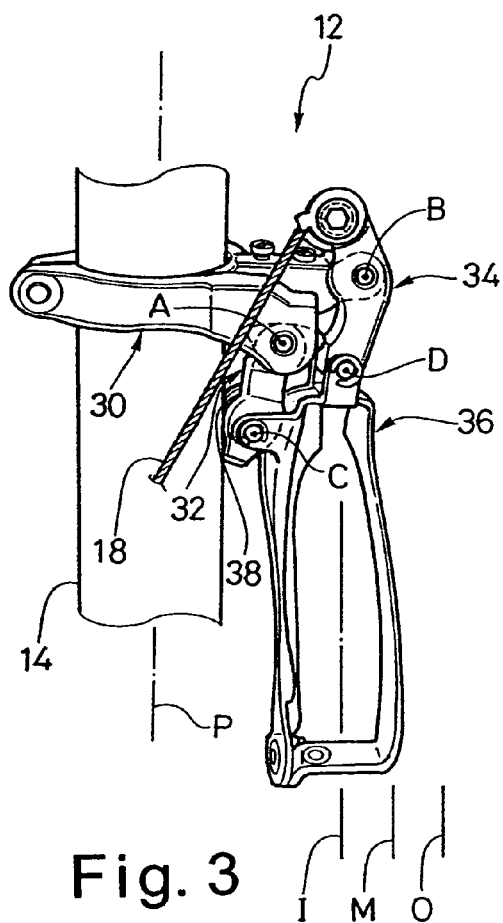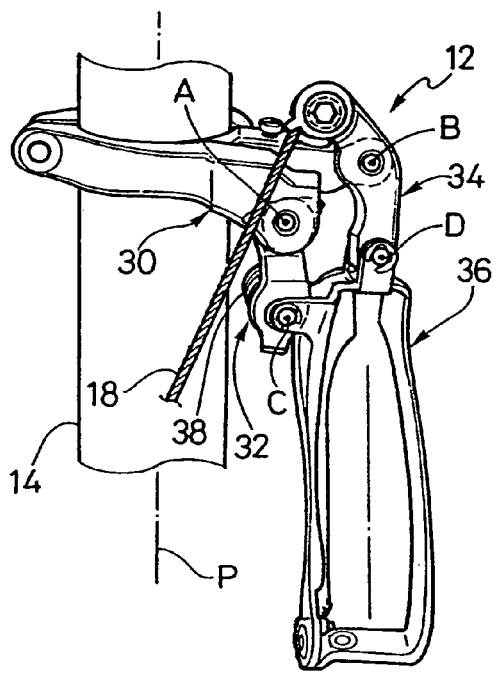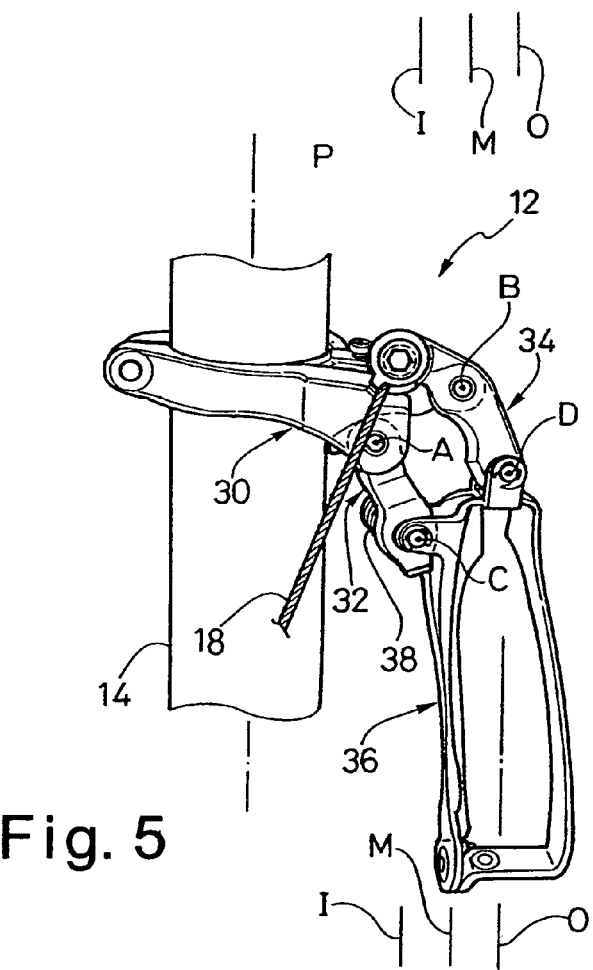

BICYCLE FRONT DERAILLEUR

CROSS-REFERENCE TO RELATED APPLICATIONS

This application is a divisional application of U.S. patent application Ser. No. 10/364,350 filed on Feb. 12, 2003, now U.S. Pat. No. 7,081,058, which issued on Jul. 25, 2006. The entire disclosure of U.S. Pat. No. 7,081,058 is hereby incorporated herein by reference.

BACKGROUND OF THE INVENTION

1. Field of the Invention

This invention generally relates to a bicycle front derailleur. More specifically, the present invention relates to a bicycle front derailleur that smoothly and reliably shifts a bicycle chain between the front sprockets of the drive train.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One part of the bicycle that has been extensively redesigned is the front derailleur. A front derailleur is typically mounted onto the bicycle frame adjacent to the front sprockets.

Generally, a front derailleur includes a fixed member non-movably secured to a bicycle frame, and a movable member supported to be movable relative to the fixed member. Typically, the fixed member is a tubular clamping member that is secured to the seat tube. Alternatively, the fixed member is sometimes coupled to the bottom bracket. The movable member typically has a chain guide with a pair of cage plates for contacting and moving a chain between the front sprockets. The movable member is usually biased in a given direction relative to the fixed member by a spring. The movable member is usually moved relative to the fixed member by pulling and/or releasing a shift control cable that is coupled to the front derailleur. The movable member and the fixed member usually are interconnected through pivotal links.

One problem with typical front derailleurs is that the various members experience a variety of forces from the control element (wire), links, biasing member and chain (resistance). These forces can cause stresses and/or deformation to the various members, and thus, smooth shifting can be adversely affected. Another problem with typical front derailleurs is that they can be relatively heavy in order to reduce stresses and/or deformation of the various members. Moreover, these prior art derailleurs can be relatively complicated and expensive to manufacture and assemble.

In view of the above, it will be apparent to those skilled in the art from this disclosure that there exists a need for an improved bicycle front derailleur that overcomes the above mentioned problems in the prior art. This invention addresses this need in the art as well as other needs, which will become apparent to those skilled in the art from this disclosure.

SUMMARY OF THE INVENTION

One object of the present invention is to provide a front bicycle derailleur that provides smooth, reliable shifting of the bicycle chain between the front sprockets of the drive train.

Another object of the present invention is to provide a front bicycle derailleur with increased rigidity, i.e. which reduces stresses and/or deformation of the various parts of the front bicycle derailleur, yet is relatively lightweight.

Yet another object of the present invention is to provide front bicycle derailleur that is relatively simple and inexpensive to manufacture and/or assemble.

The foregoing objects can basically be attained by providing a bicycle front derailleur comprising a base member, a movable member, a first link member, a second link member and a biasing member. The base member is configured to be coupled to a bicycle frame. The movable member has a front end, a rear end and a chain guide portion configured to be moved between first and second positions. The first link member includes a first coupling portion pivotally coupled to the base member and a second coupling portion pivotally coupled to the movable member about a first pivot axis. The second link member includes a first coupling portion pivotally coupled to the base member and a second coupling portion pivotally coupled to the movable member about a second pivot axis. The biasing member is disposed on the first pivot axis to normally bias the movable member to the first position relative to the base member. The biasing member is at least partially located in front of the first coupling portion of the first link member relative to the movable member when the front derailleur is mounted to the bicycle frame. The first coupling portion of the second link member includes a pair of axially spaced mounting elements pivotally coupled to axially opposed ends of an attachment element of the base member.

The foregoing objects can also basically be attained by providing a bicycle front derailleur comprising a base member, a movable member, an inner link member, an outer link member and a biasing member. The base member is configured to be coupled to a bicycle frame. The movable member has a front end, a rear end and a chain guide portion configured to be moved between first and second positions. The inner link member includes a first coupling portion pivotally coupled to the base member and a second coupling portion pivotally coupled to the movable member about a first pivot axis. The outer link member includes a first coupling portion pivotally coupled to the base member and a second coupling portion pivotally coupled to the movable member about a second pivot axis. The biasing member is disposed on the first pivot axis to normally bias the movable member to the first position relative to the base member. The biasing member is at least partially located in front of the first coupling portion of the inner link member relative to the movable member when the front derailleur is mounted to the bicycle frame.

The foregoing objects can also basically be attained by providing a bicycle front derailleur comprising a base member, a movable member, a first link member, a second link member and a biasing member. The base member is configured to be coupled to a bicycle frame. The movable member has a front end, a rear end and a chain guide portion configured to be moved between first and second positions. The first link member includes a first coupling portion pivotally coupled to the base member and a second coupling portion pivotally coupled to the movable member about a first pivot axis. The second link member includes a first coupling portion pivotally coupled to the base member and a second coupling portion pivotally coupled to the movable member about a second pivot axis. The biasing member is disposed on the first pivot axis to normally bias the movable member to the first position relative to the base member. The biasing member is at least partially located in front of the first coupling portion of the first link member relative to the movable member when the front derailleur is mounted to the bicycle frame. The first link member includes a first transitional portion arranged between the first coupling portion and the second coupling portion of the first link member such that the first coupling portion is at least partially located in front of the second coupling portion of the first link member relative to the movable member when the front derailleur is mounted to the bicycle frame.

The foregoing objects can also basically be attained by providing a bicycle front derailleur comprising a base member, a movable member, a first link member, a second link member and a biasing member. The base member is configured to be coupled to a bicycle frame. The movable member has a front end, a rear end and a chain guide portion configured to be moved between first and second positions. The first link member includes a first coupling portion pivotally coupled to the base member and a second coupling portion pivotally coupled to the movable member about a first pivot axis. The second link member includes a first coupling portion pivotally coupled to the base member and a second coupling portion pivotally coupled to the movable member about a second pivot axis. The biasing member is disposed on the first pivot axis to normally bias the movable member to the first position relative to the base member. The biasing member is at least partially located in front of the first coupling portion of the first link member relative to the movable member when the front derailleur is mounted to the bicycle frame. The second link member has a cable attachment portion configured to have a control cable coupled thereto.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3 is a rear perspective view of the front derailleur of the bicycle illustrated in FIG. 1 with the chain guide in an inner most shift position I, with the inner shift position I, middle shift position M and outer most shift position O shown in broken lines;

FIG. 4 is a rear perspective view of the front derailleur of the bicycle illustrated in FIG. 1 with the chain guide in the middle/intermediate shift position M, with the inner shift position I, middle shift position M and outer most shift position O shown in broken lines;

FIG. 5 is a rear perspective view of the front derailleur of the bicycle illustrated in FIG. 1 with the chain guide in the outer most shift position O, with the inner shift position I, middle shift position M and outer most shift position O shown in broken lines;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
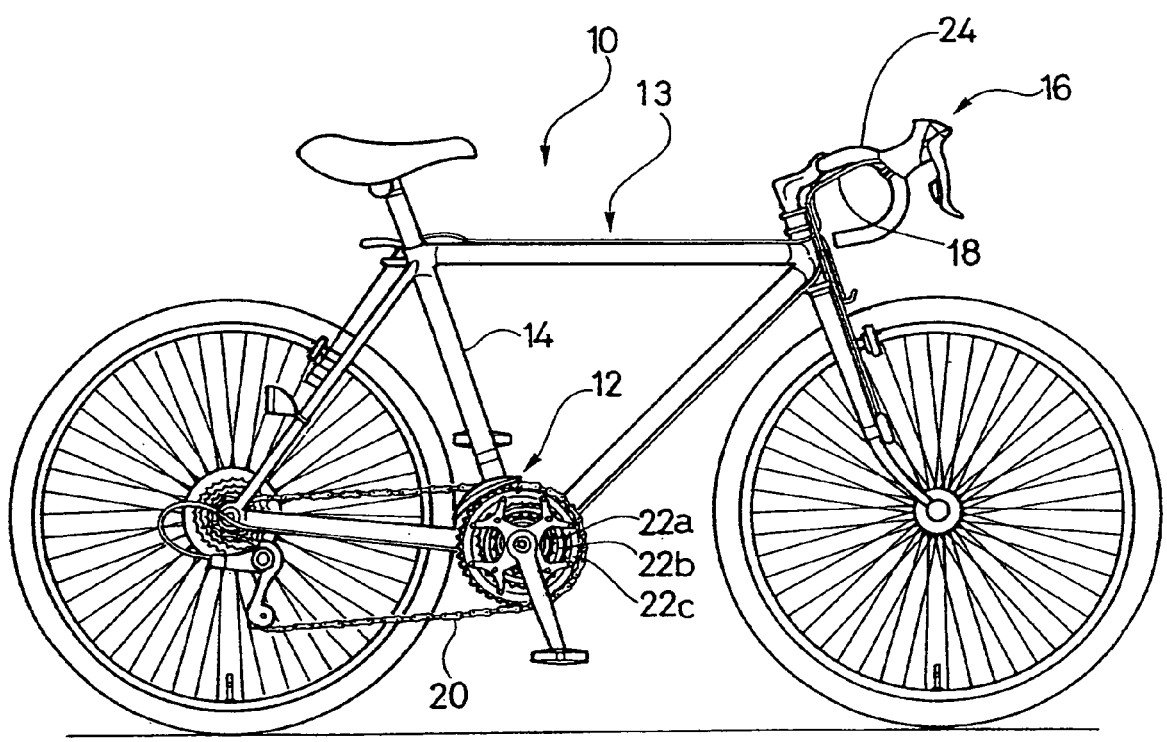
FIG. 1 is a side elevational view of a bicycle with a front derailleur in accordance with the present invention.
Figure 2:
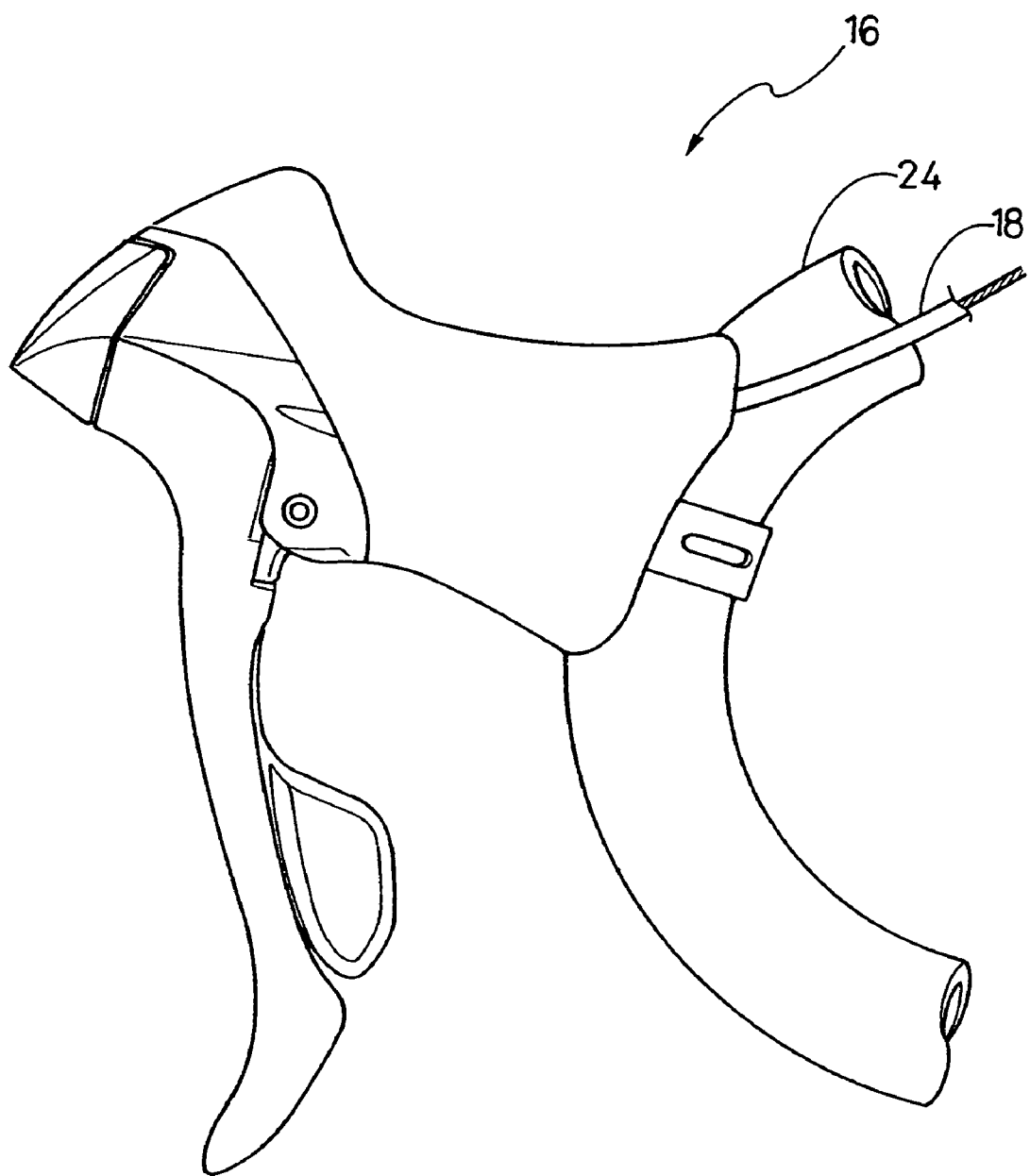
FIG. 2 is an opposite side elevational view of the view of a front shifter or shift operating device that operates the front derailleur illustrated in FIG. 1.

Referring initially to FIGS. 1 and 2, a bicycle 10 with a front derailleur 12 is illustrated in accordance with a first embodiment of the present invention. The front derailleur 12 is fixedly coupled to a seat tube 14 of a bicycle frame 13. The front derailleur 12 is operated in a conventional manner by a shifting unit 16 via a shift control or derailleur cable 18 to move a chain 20 between three front sprockets 22a, 22b and 22c of the drive train. The shifting unit 16 is mounted on the handlebar 24 as seen in FIG. 2. While the front derailleur 12 is illustrated as a three-stage or three position derailleur shifting the chain 20 between the three front sprockets 22a, 22b and 22c of the drive train, it will be apparent to those skilled in the art from this disclosure that the front derailleur 12 can be used in a drive train with only two front sprockets as needed and/or desired.

Bicycles and their various components are well known in the art, and thus, bicycle 10 and its various components will not be discussed and/or illustrated in detail herein, except for the components that relate to the present invention. In other words, only the front derailleur 12 and the components that relate thereto will be discussed and/or illustrated in detail herein. As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Referring now to FIGS. 3–5, the front derailleur 12 of the present invention will now be discussed in more detail. The front derailleur 12 basically includes a base member 30, an inner link member 32, an outer link member 34, a movable member 36 and a biasing member 38. The base member 30 is fixedly coupled to the seat tube 14 of the bicycle frame 13. The movable member 36 has a chain guide with chain guide surfaces configured to laterally move the chain 20, as discussed below in more detail. The inner and outer link members 32 and 34 are pivotally coupled to the base member 30 at their upper ends to pivot relative to the base member 30 about upper pivot axes A and B, respectively. The inner and outer link members 32 and 34 are also pivotally coupled to the movable member 36 at their lower ends to pivot relative to the movable member 36 about lower pivot axes C and D, respectively. The biasing member 38 is preferably disposed on the pivot axis C, and is at least partially located in front of a part of the inner link member 32 that is coupled to the base member 30 at the pivot axis A, as discussed below in more detail. More specifically, the biasing member 38 is coupled between the inner link member 32 and the movable member 36 to apply an urging force that normally biases the movable member 36 toward the seat tube 14 of the bicycle frame 13.

In the illustrated embodiment, the front derailleur 12 is a bottom swing type front derailleur. Thus, the movable member 36 moves laterally outward and upwardly relative to a center longitudinal plane P of the bicycle frame 13 when the control cable 18 is pulled by the shifting unit 16. Accordingly, the movable member 36 moves laterally towards/away from the seat tube 14 of the bicycle frame 13 to shift the chain 20 laterally between the front sprockets 22a, 22b and 22c by operating the shifting unit 16, which releases/pulls the shift control cable 18. In other words, the inner and outer links 32 and 34 swing below the pivot axes A and B to form a four bar linkage assembly together with the base member 30 and the movable member 36 of the front derailleur 12 in a relatively conventional manner.

Referring to FIGS. 6–12, the base member 30 basically includes a frame fixing portion 40 and a mounting portion 42. The frame fixing portion 40 is configured to be fixedly coupled to the seat tube 14. The mounting portion 42 pivotally supports the inner and outer link members 32 and 34. Preferably, the parts of the base member 30 are constructed of metallic materials. However, some of the parts can be constructed of hard, rigid non-metallic materials, such as a hard plastic material.

The frame fixing portion 40 includes a first C-shaped tubular clamping section 40a, a second C-shaped tubular clamping section 40b, a pivot pin 40c and a threaded fastener 40d. Thus, the frame fixing portion 40 is preferably a tubular clamping portion of the base member 30. The pivot pin 40c pivotally couples a pair of adjacent ends of the tubular clamping sections 40a and 40b together in a conventional manner. The fastener 40d releaseably couples the free ends of the tubular clamping sections 40a and 40b together in a conventional manner. For example, the fastener 40d is preferably a screw or bolt that extends through a hole in the free end of the second clamping section 40b and that is threaded into a threaded hole of the first clamping section 40a in a conventional manner. Alternatively, the fastener 40d can be utilized in conjunction with a nut, or the like (not shown). When the first and second clamping sections 40a and 40b are coupled together, a center frame mounting axis X is formed by the curved inner mounting surfaces of the first and second clamping sections 40a and 40b. This center frame mounting axis C substantially corresponds to the center axis of the seat tube 14 and lies in the center plane P.

The first tubular clamping section 40a preferably has the mounting portion 42 integrally formed therewith as a one-piece unitary member. Thus, the base member 30 is basically constructed of two pieces (i.e., the clamping sections 40a and 40b) that are coupled together by the pivot pin 40c and the fastener 40d, with each being constructed of a light-weight, rigid material. Preferably, the clamping sections 40a and 40b are constructed of metal. Moreover, the clamping portions 40a and 40b are preferably constructed by utilizing conventional manufacturing techniques such as casting and/or machining. However, it will be apparent to those skilled in the art from this disclosure that the clamping sections 40a and 40b could be constructed of other materials and/or could be constructed using other manufacturing techniques as needed and/or desired.

The mounting portion 42 of the first clamping section 40a of the base member 30 has the inner and outer link members 32 and 34 pivotally coupled thereto, as mentioned above. Specifically, the mounting portion 42 includes a main body 44, a pair of inner mounting flanges or attachment elements 46a and 46b and an outer mounting flange or attachment element 48. The inner link member 32 is pivotally coupled between the attachment elements 46a and 46b. The outer link member 34 is pivotally coupled to the outer attachment element 48.

The main body 44 includes a pair of threaded adjustment holes 45a and 45b with a pair of vertical adjustment screws 50a and 50b threadedly coupled therein, respectively. The adjustment hole 45a is located closer to the center plane P than the adjustment hole 45b. The adjustment screws 50a and 50b can be rotated to adjust their vertical positions such that their free ends selectively contact the inner link member 32 to control the range of movement of the inner link member 32, and thus, control the range of movement of the movable member 36, as discussed below in more detail.

The attachment elements 46a and 46b of the mounting portion 42 extend downwardly from the main body 44, and are substantially parallel to each other. The attachment element 46b is spaced rearwardly from the attachment element 46a relative to the center longitudinal plane P of the bicycle 10. Accordingly, a recess is formed between the attachment elements 46a and 46b for receiving the inner link member 32. Thus, the attachment element 46a can be considered a front attachment element, while the attachment element 46b can be considered a rear attachment element. The attachment element 46a includes a vertical support surface 52 and a blind bore 54. The vertical support surface 52 is preferably substantially perpendicular to the center longitudinal plane P and faces in the rearward direction of the bicycle 10. The blind bore 54 extends in the forward direction of the bicycle 10 from the support surface 52.

Figure 11:
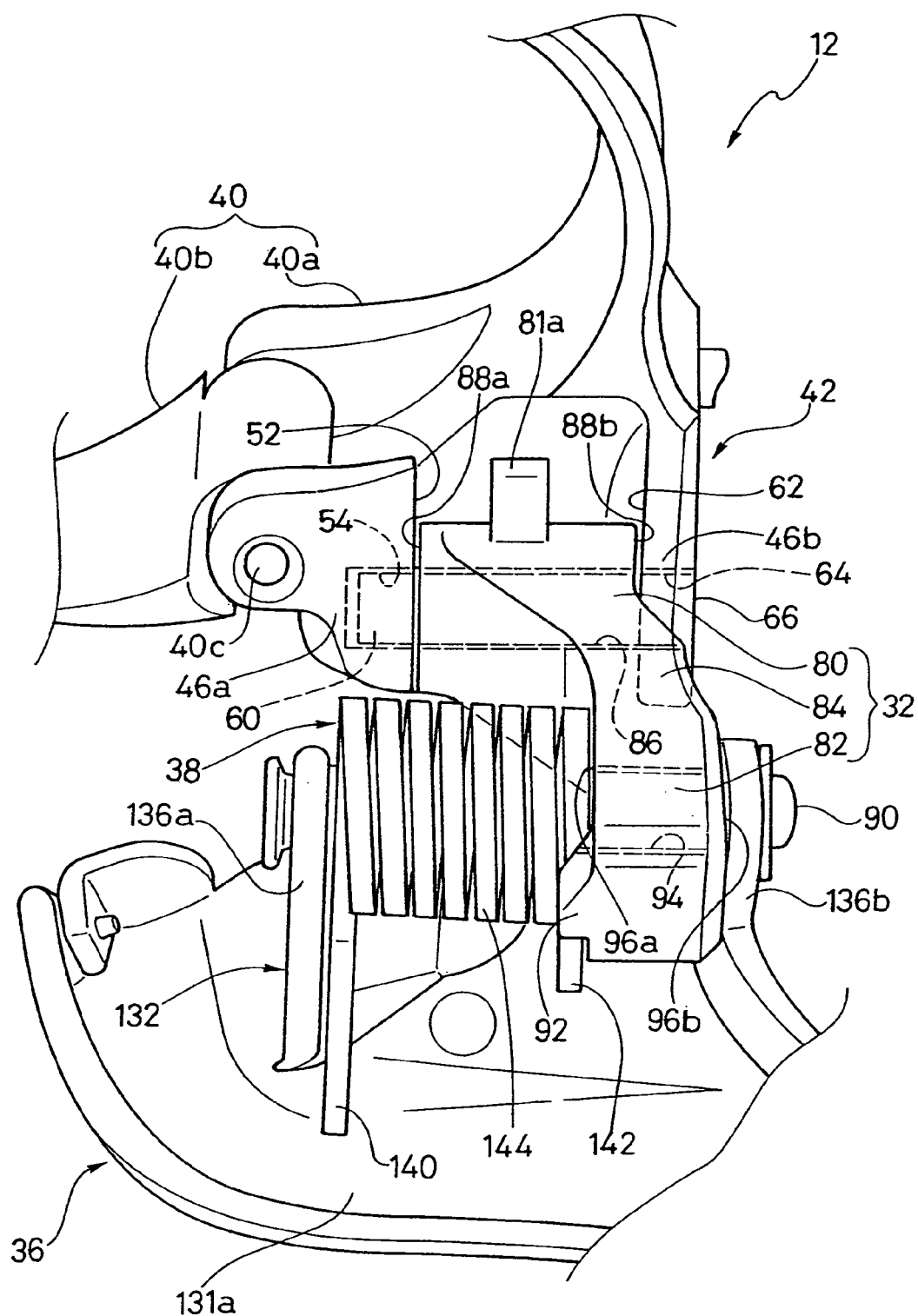
FIG. 11 is an enlarged, partial, bottom/inside perspective view of the front derailleur of the bicycle illustrated in FIG. 1.

The rear attachment element 46b includes a vertical support surface 62, a through bore 64 and a vertical end surface 66. The through bore 64 is axially aligned with the blind bore 54 of the front attachment element 46a, as best seen in FIG. 11. The support surface 62 is preferably parallel to the support surface 52 and faces in the forward direction of the bicycle 10. The vertical support surfaces 52 and 62 have the inner link member 32 pivotally coupled therebetween. The end surface 66 is preferably parallel to the support surfaces 52 and 62. The bores 54 and 64 have their axes extending substantially parallel to the center plane P of the bicycle 10 when the front derailleur 12 is installed thereon. The bores 54 and 64 have a pivot pin 60 fixedly coupled therein by press fitting or the like to rotatably support the inner link member 32. The pivot axis A is formed by the center axis of the pivot pin 60, which is centrally axially located in the bores 54 and 64.

The attachment element 48 of the mounting portion 42 basically includes a front support surface 72, a through bore 74 and a rear support surface 76. The through bore 74 extends between the front and rear support surfaces 72 and 76, and is sized to rotatably receive a pivot pin 70 that is fixedly coupled to the outer link member 34. The through bore 74 is parallel to the bores 54 and 64. The front support surface 72 faces in the forward direction, while the rear support surface 76 faces in the rearward direction. The support surfaces 72 and 76 are preferably parallel to each other, and are preferably parallel to the support surfaces 52 and 62 of the inner attachment elements 46a and 46b, respectively. Moreover, the support surfaces 72 and 76 are preferably aligned with or only slightly offset from (e.g. substantially aligned with) the support surfaces 52 and 62 of the attachment elements 46a and 46b, respectively. Preferably, the outer attachment element 48 also includes a cylindrical shaped outer surface that is parallel to the through bore 74. The pivot axis B is formed by the center axis of the pivot pin 70, which is centrally axially located in the through bore 74.

Referring still to FIGS. 6–12, the inner link member 32 basically includes an upper coupling portion 80, a lower coupling portion 82 and a transitional portion 84 arranged longitudinally between the upper and lower coupling portions 80 and 82. The inner link member 32 is preferably constructed of a lightweight, rigid material. Specifically, the inner link member 32 is preferably constructed of metal as a one-piece, unitary member utilizing conventional manufacturing techniques such as casting and/or machining. However, it will be apparent to those skilled in the art from this disclosure that the inner link member 32 could be constructed of other materials and/or could be constructed using other manufacturing techniques as needed and/or desired.

The upper coupling portion 80 of the inner link member 32 is pivotally coupled to the base member 30 via the pivot pin 60, while the lower coupling portion 82 of the inner link member 32 is pivotally coupled to the movable member 36 via a pivot pin 90. The upper coupling portion 80 is wider (thicker), as measured in the axial direction of the pivot pin 60, than the lower coupling portion 82, as measured in the axial direction of the pivot pin 90. Moreover, the lower coupling portion 82 is offset in the rearward direction of the bicycle 10 from the upper coupling portion 80. In other words, the upper coupling portion 80 is preferably at least partially located in front of the lower coupling portion 82 relative to the movable member 36 when the front derailleur 12 is coupled to the seat tube 14 of the bicycle frame 13. The transitional portion 84 has a varying thickness that decreases as the transitional portion 84 approaches the lower coupling portion 82 from the upper coupling portion 80.

The upper coupling portion 80 of the inner link member 32 includes an inner projection 81a, and outer projection 81b and a through bore 86. The inner projection 81a is designed to selectively contact the lower end of the adjustment screw 50a mounted in the inner adjustment hole 45a. The outer projection 81b is designed to selectively contact the lower end of the adjustment screw 50b mounted in the outer adjustment hole 45b. The outer projection 81b is also configured to act as a stop member that selectively contacts the outer link member 34 if the adjusting screw 50a mounted in the inner adjustment hole 45a is loosened beyond a predetermined position. In other words, if the adjustment screw 50a mounted in the inner adjustment hole 45a is loosened too much, the inner projection 81a will not contact the lower end of that adjustment screw 50a, but the outer projection 81b will contact the outer link member 34.

The through bore 86 of the inner link member 32 has the pivot pin 60 rotatably received therein such that the upper coupling portion 80 pivots about the pivot axis A relative to the base member 30. The through bore 86 extends between oppositely facing (front and rear) parallel surfaces 88a and 88b of the upper coupling portion 80. The oppositely facing surfaces 88a and 88b face the support surfaces 52 and 62 of the inner attachment elements 46a and 46b, respectively. Preferably, the oppositely facing surfaces 88a and 88b are configured to contact washers that are located between the support surfaces 52 and 62, and the oppositely facing surfaces. Thus, the upper coupling portion 80 freely slides relative to the support surfaces 52 and 62. Alternatively, the oppositely facing surfaces 88a and 88b and/or the support surfaces 52 and 62 can have a low friction coating or material applied thereto and/or a member located therebetween.

The lower coupling portion 82 is pivotally coupled to the movable member 36 via the pivot pin 90. The lower coupling portion 82 basically includes an abutment projection 92 and a through bore 94 extending between oppositely facing (front and rear) parallel surfaces 96a and 96b. The abutment projection 92 is configured to engage one end of the biasing member 38. The through bore 94 is configured to rotatably receive the pivot pin 90. The pivot pin 90, preferably, has an enlarged head at one end and a retaining clip at the other end to couple the lower coupling portion 82 to the movable member 36 with the biasing member 38 arranged therebetween. The oppositely facing surfaces 96a and 96b of the lower coupling portion 82 are offset in the rearward direction from the oppositely facing surfaces 88a and 88b of the upper coupling portion 80, respectively.

More specifically, the lower rear surface 96b is preferably offset from the upper rear surface 88b to be aligned or substantially aligned (less than the thickness of the attachment element 46b) with the vertical end surface 66 of the rear attachment element 46b. The lower front surface 96a is preferably offset from the upper front surface 88a by a larger amount than the lower rear surface 96b is offset from the upper rear surface 88b due to the configuration of the transitional portion 84. In other words, the lower coupling portion 82 preferably has a thickness about one-half of the thickness or width of the upper coupling portion 80. The lower front surface 96a supports the biasing member 38 such that the biasing member engages the abutment projection 92, as discussed below in more detail.

Referring still to FIGS. 6–12, the outer link member 34 basically includes an upper coupling portion 100, a lower coupling portion 102 and a cable attachment portion 104 extending from the upper coupling portion 100. The outer link member 34 is preferably constructed of a lightweight, rigid material. Specifically, the outer link member 34 is preferably constructed of metal as a one-piece, unitary member utilizing conventional manufacturing techniques such as casting and/or machining. However, it will be apparent to those skilled in the art from this disclosure that the outer link member 34 could be constructed of other materials and/or could be constructed using other manufacturing techniques as needed and/or desired.

The upper coupling portion 100 of the outer link member 34 is pivotally coupled to the base member 30 via the pivot pin 70 while the lower coupling portion 102 of the outer link member 34 is pivotally coupled to the movable member 36 via a pivot pin 110. The pivot pin 110 is identical to the pivot pin 90, except the pivot pin 110 is shorter than the pivot pin 90. The upper coupling portion 100 is wider (thicker), as measured in the axial direction of the pivot pin 100, than the lower coupling portion 102, as measured in the axial direction of the pivot pin 70. The cable attachment portion 104 of the outer link member 34 extends upwardly from the upper coupling portion 100, and is configured to have the control cable 18 fixedly coupled thereto via a bolt. Thus, when the control cable 18 is pulled/released, the outer link member 34 will rotate about the pivot axis B to move the movable member 36 laterally relative to the base member 30.

Figure 6:
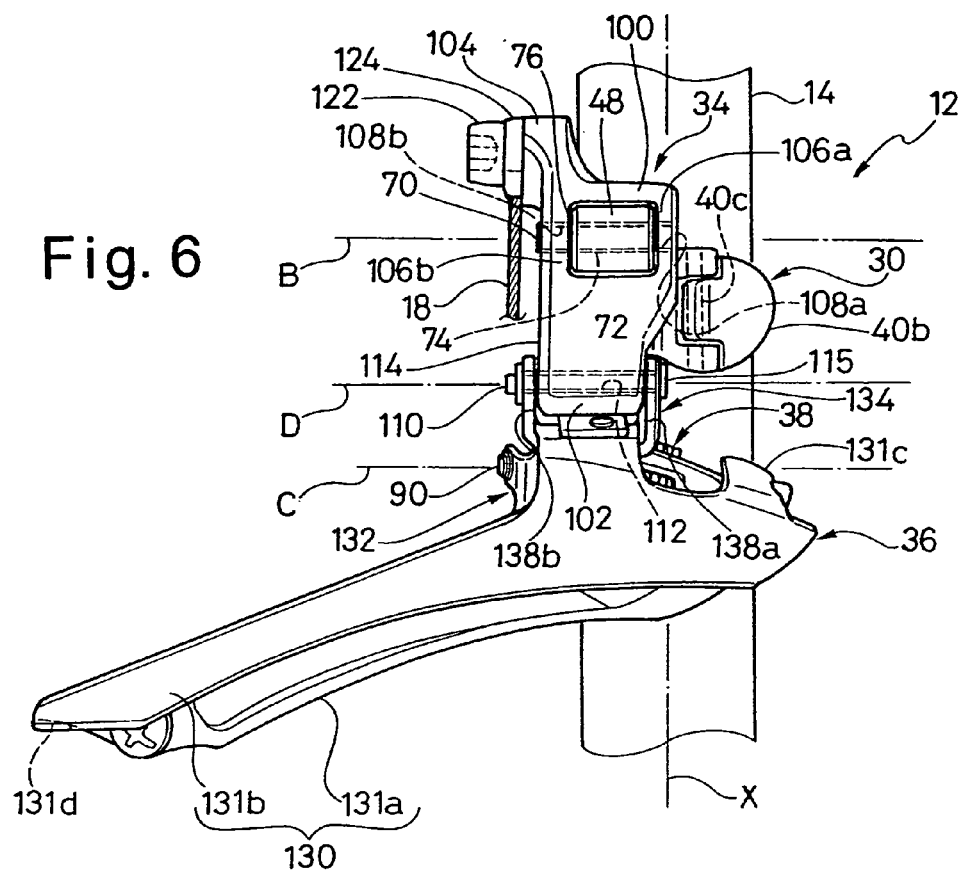
FIG. 6 is an enlarged side elevational view of the front derailleur of the bicycle illustrated in FIG. 1, with the front derailleur coupled to the seat tube.

The upper coupling portion 100 of the outer link member 34 includes a pair of longitudinally spaced parallel (front and rear) mounting flanges or attachment elements 106a and 106b with through bores 108a and 108b, respectively, as best seen in FIG. 6. The attachment elements 106a and 106b are configured to receive the outer attachment 48 of the base member 30 longitudinally therebetween. The through bores 108a and 108b have the pivot pin 70 fixedly coupled therein by press fitting or the like such that the pivot pin 70 normally rotates with the upper coupling portion 100 about the pivot axis B relative to the base member 30. The attachment elements 106a and 106b are supported by the front and rear support surfaces 72 and 76 of the outer attachment element 48 of the base member 30. Preferably, the attachment elements 106a and 106b are supported by the front and rear support surfaces 72 and 76 of the outer attachment element 48, yet freely slide relative to the support surfaces 72 and 76. The attachment elements 106a and 106b and/or the front and rear support surfaces 72 and 76 can have a low friction coating or material applied thereto and/or a member located therebetween as needed and/or desired.

Figure 7:
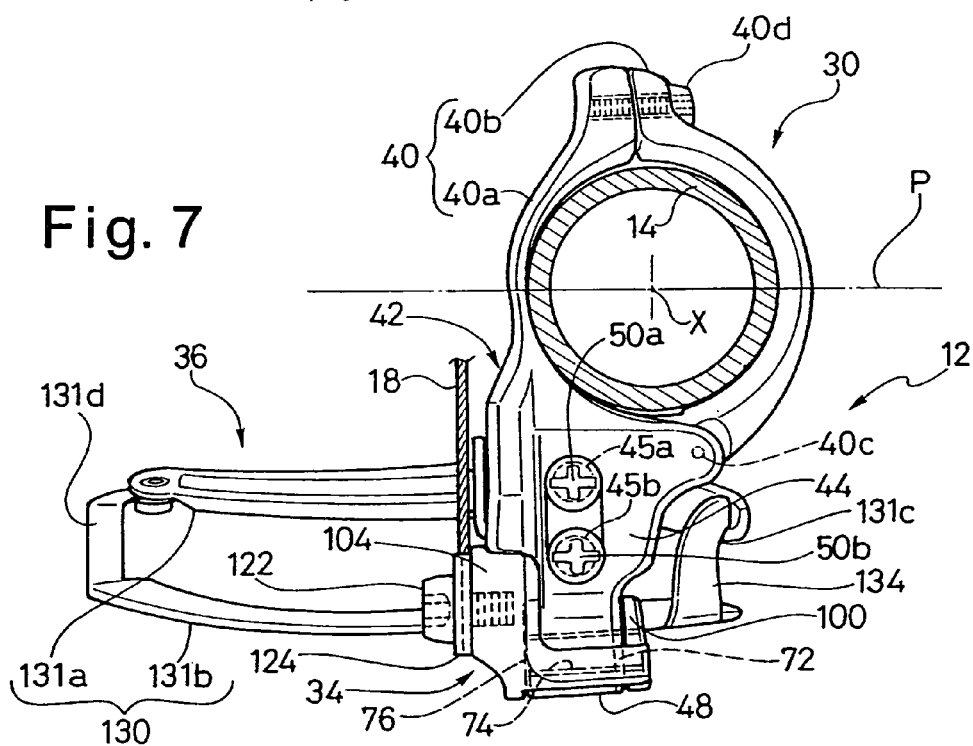
FIG. 7 is a top, plan view of the front derailleur of the bicycle illustrated in FIG. 1, with the front derailleur coupled to the seat tube.
Figure 8:
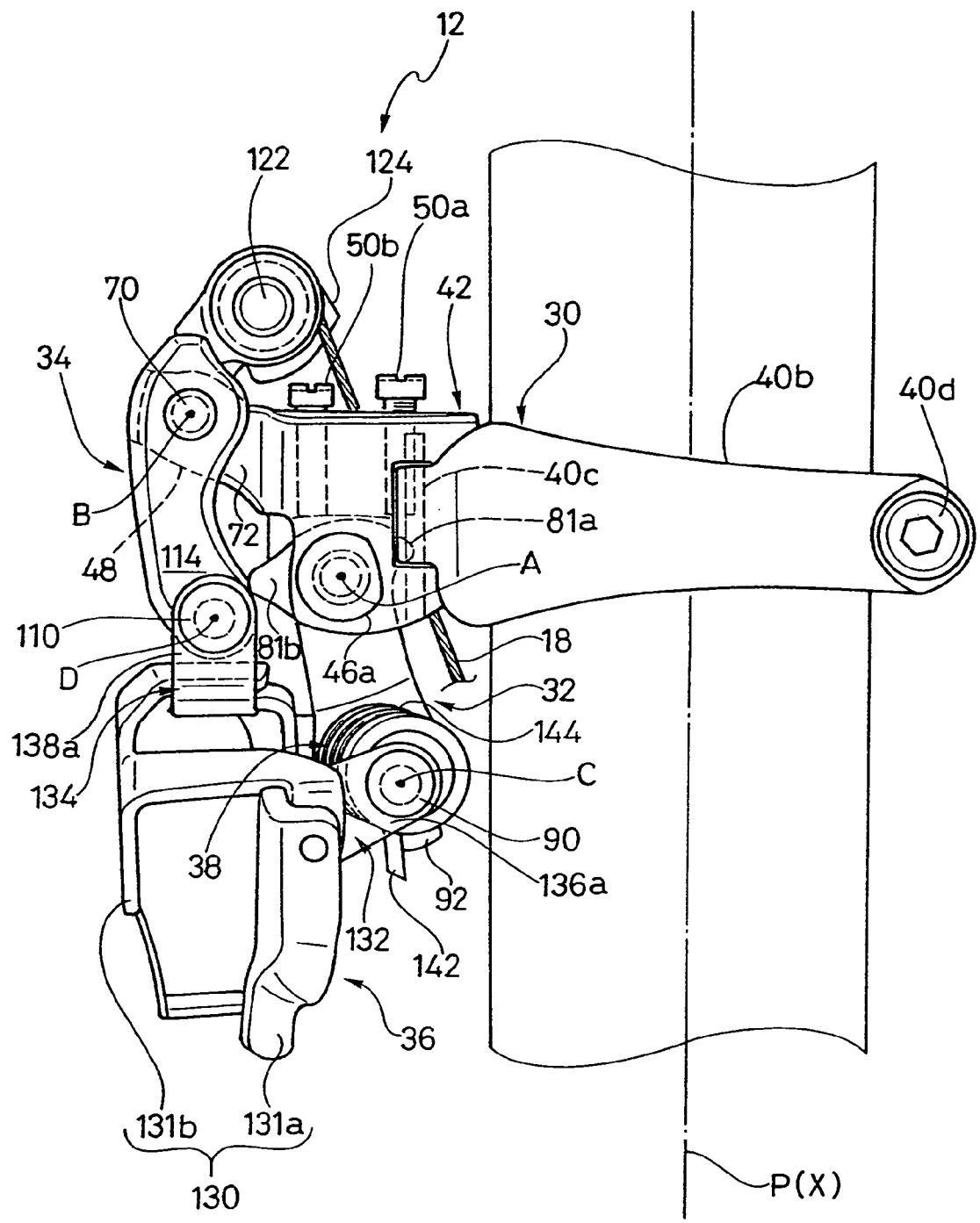
FIG. 8 is an enlarged front elevational view of the front derailleur of the bicycle illustrated in FIG. 1, with the front derailleur coupled to the seat tube.

The upper coupling portion 100 of the outer link member 34 is illustrated as having a through opening to form the attachment elements 106a and 106b, as best seen in FIGS. 6–8. In other words, the attachment element 48 of the base member 30 is visible (exposed) as seen from the outside in FIG. 6. However, the attachment elements 106a and 106b could be formed by an outwardly extending recess rather than a through opening. Thus, the attachment element 48 of the base member 48 could be substantially enclosed (covered) by the outer link member 34 such that the attachment element 48 would not be visible in FIG. 6. In any case, the upper coupling portion 100 of the outer link member 34 preferably includes the longitudinally spaced attachment elements 106a and 106b supported at opposite ends of the attachment element 48 of the base member 30. This arrangement contributes to improved rigidity.

Figure 9:
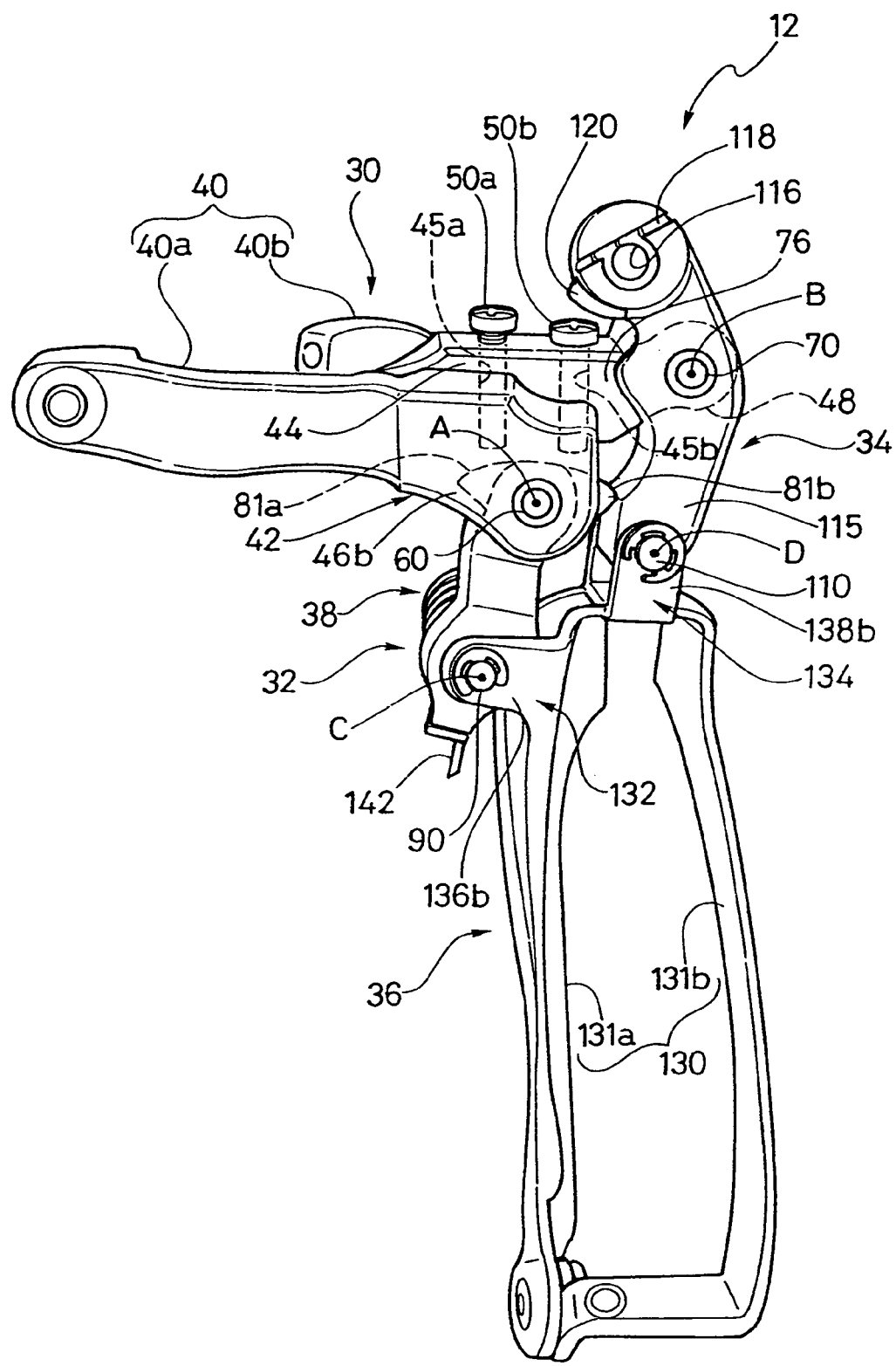
FIG. 9 is an enlarged rear perspective view of the front derailleur of the bicycle illustrated in FIG. 1.

As best seen in FIGS. 6, 8 and 9, the lower coupling portion 102 of the outer link member 34 basically includes a longitudinal through bore 112 rotatably receiving the pivot pin 110 to pivotally couple the movable member 36 to the lower coupling portion 102. The lower coupling portion 102 has a planar rear end surface 114 and a front end surface 115 that is preferably aligned with the front support surface 72 of the outer attachment element 48. The front end surface 115 of the lower coupling portion 102 is preferably offset in the rearward direction from the front end surface of the upper coupling portion 100. In other words, due to the configuration of the attachment elements 106a and 106b, the front surface of the outer link member 34 preferably flares forward as it approaches the upper coupling portion 100. However, the rear surface 114 of the outer link member 34 (i.e. the upper and lower coupling portion 100 and 102) is preferably a planar surface that is parallel to and aligned with the rear end surface 66 of the attachment element 46b of the base member.

The cable attachment portion 104 is narrower (thinner) than both the upper coupling portion 100 and the lower coupling portion 102 in the axial direction of the pivot pins 70 and 110. The cable attachment portion 104 extends from the rearward portion of the upper coupling portion 100, as best seen in FIG. 9. The cable attachment portion 104 basically includes a threaded through bore 116, a rearwardly facing textured groove 118 and a protrusion 120. A cable fixing bolt 122 is preferably threadedly coupled within the threaded bore 116 to hold a cable fixing plate 124 against the rearwardly facing surface of the cable attachment portion 104 to retain the control cable 18 within the textured groove 118. The cable fixing plate 124 engages the protrusion 120 to prevent rotation of the cable fixing plate 124 when the cable fixing bolt 122 is rotated.

Referring still to FIGS. 6–12, the movable member 36 basically includes a chain guide 130, an inner mounting portion 132 and an outer mounting portion 134. The movable member 36 is preferably constructed of two pieces of relatively lightweight, hard rigid material that are fixedly coupled together. For example, the movable member 36 is preferably constructed of two pieces of a metal material such as a rigid sheet metal that is bent to the desired shape. The chain guide 130 has a chain receiving slot that is formed by a pair of vertical shift plates 131a and 131b that are preferably separate pieces. The forward ends of the shift plates 131a and 131b form a front end of the chain guide 130. The vertical shift plates 131a and 131b are adapted to engage the chain 20, and thus, move the chain 20 in a direction substantially transverse to the bicycle 10. The shift plates 131a and 131b are connected together by a pair (upper and lower) of plates 131c and 131d in a conventional manner utilizing fasteners such as screw(s), rivet(s) and/or press fitted pin(s). The lower plate 131d together with the rearward ends of the shift plates 131a and 131b form a rear end of the chain guide 130.

Figure 10:
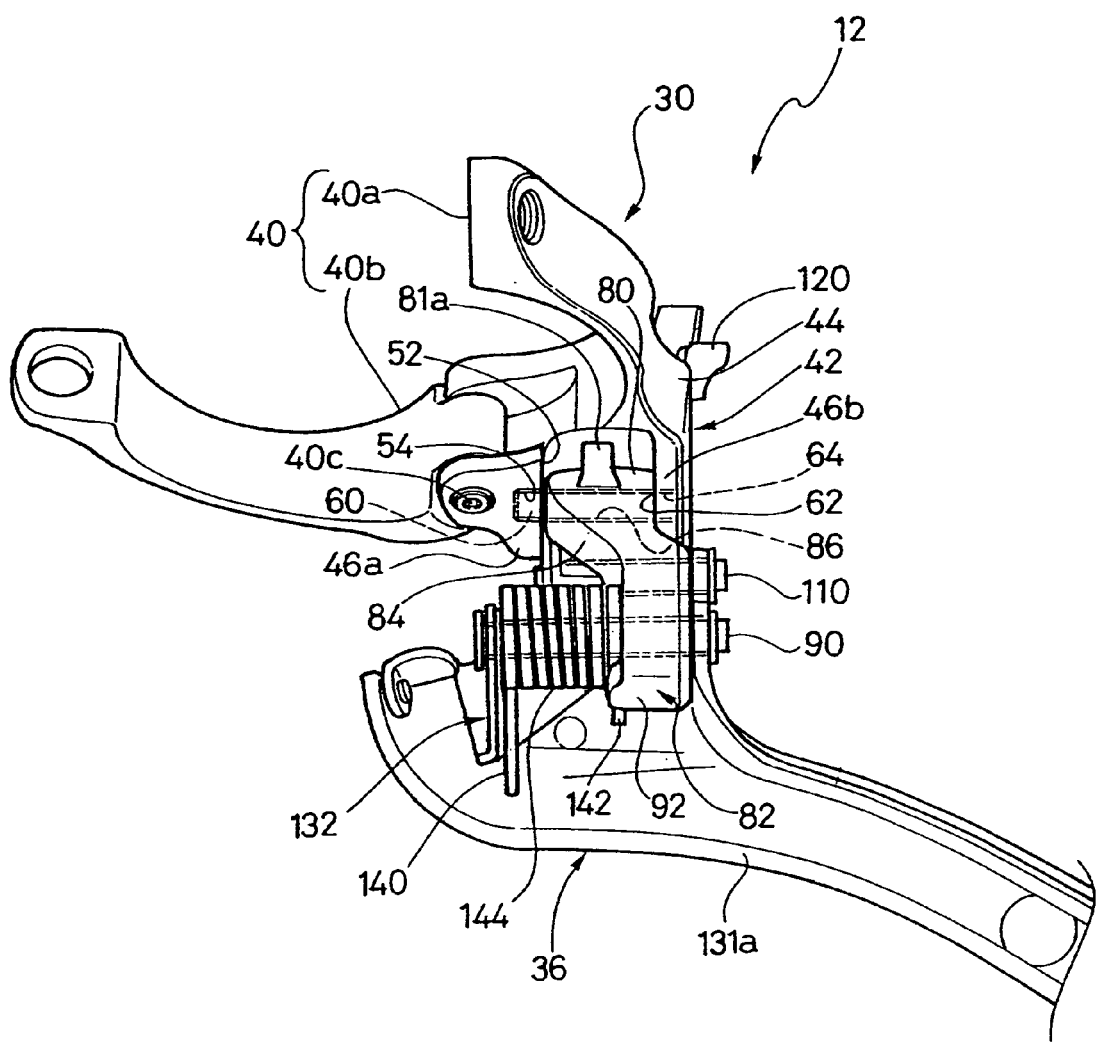
FIG. 10 is an enlarged, partial, bottom/inside perspective view of the front derailleur of the bicycle illustrated in FIG. 1.

As mentioned above, the vertical shift plates 131a and 131b are adapted to engage the chain 20 to move the chain 20 laterally. Specifically, the shift plate 131a or the shift plate 131b typically contacts the chain 20 to move the chain 20 laterally outwardly or inwardly, respectively. More specifically, each of the shift plates 131a and 131b typically selectively contact the chain 20 at an area O that is spaced longitudinally rearwardly from the inner and outer link members 32 and 34, as seen in FIG. 10. Because the lower coupling portion 82 of the inner link member 32 is located rearwardly of the upper coupling portion 80 of the inner link member 32, the chain guide 130 is supported by the inner link member 32 at a location that is longitudinally closer to the area O than the upper coupling portion 80. In other words, the lower coupling portion 82 of the inner link member 32 is located relatively longitudinally close to the area O to support the chain guide 130. This arrangement contributes to a reduction in bending of the chain guide 130, and thus, improved shifting of the front derailleur 12.

The inner mounting portion 132 of the movable member 36 includes a pair of longitudinally spaced (front and rear) mounting flanges or attachment elements 136a and 136b extending from the inner shift plate 131a for pivotally coupling the lower coupling portion 82 of the inner link member 32 and the biasing member 38 therebetween via the pivot pin 90. The outer mounting portion 134 of the movable member 36 includes a pair of longitudinally spaced (front and rear) mounting flanges or attachment elements 138a and 138b extending from the upper plate 131c of the chain guide 130 for pivotally coupling the lower coupling portion 102 of the outer link member 34 therebetween via the pivot pin 110.

Preferably, the mounting flanges or attachment elements 136a, 136b, 138a and 138b are integrally formed with the inner shift plate 131a as a one-piece, unitary member. Moreover, the mounting flanges or attachment elements 136a, 136b, 138a and 138b are preferably configured such that the biasing member 138 is located in front of the lower coupling portion 82 of the inner link member 32 in this embodiment. In other words, the rear attachment elements 136b and 138b are preferably aligned with each other to contact and/or support the rear surface 96b of the inner link member 32 and the rearward facing surface 114 of the outer link member 34, respectively. However, the front attachment element 136a is preferably located in the forward direction from the front attachment element 138a. Moreover, the front attachment element 136a is preferably located in the forward direction from the front support surface 52 of the base member 30.

The attachment elements 136a, 136b, 138a and 138b, the pivot pins 90 and 110, and/or the lower coupling portions 82 and 102 can have a low friction coating or material applied thereto and/or a member therebetween to allow smooth movement between these various members.

Figure 12:
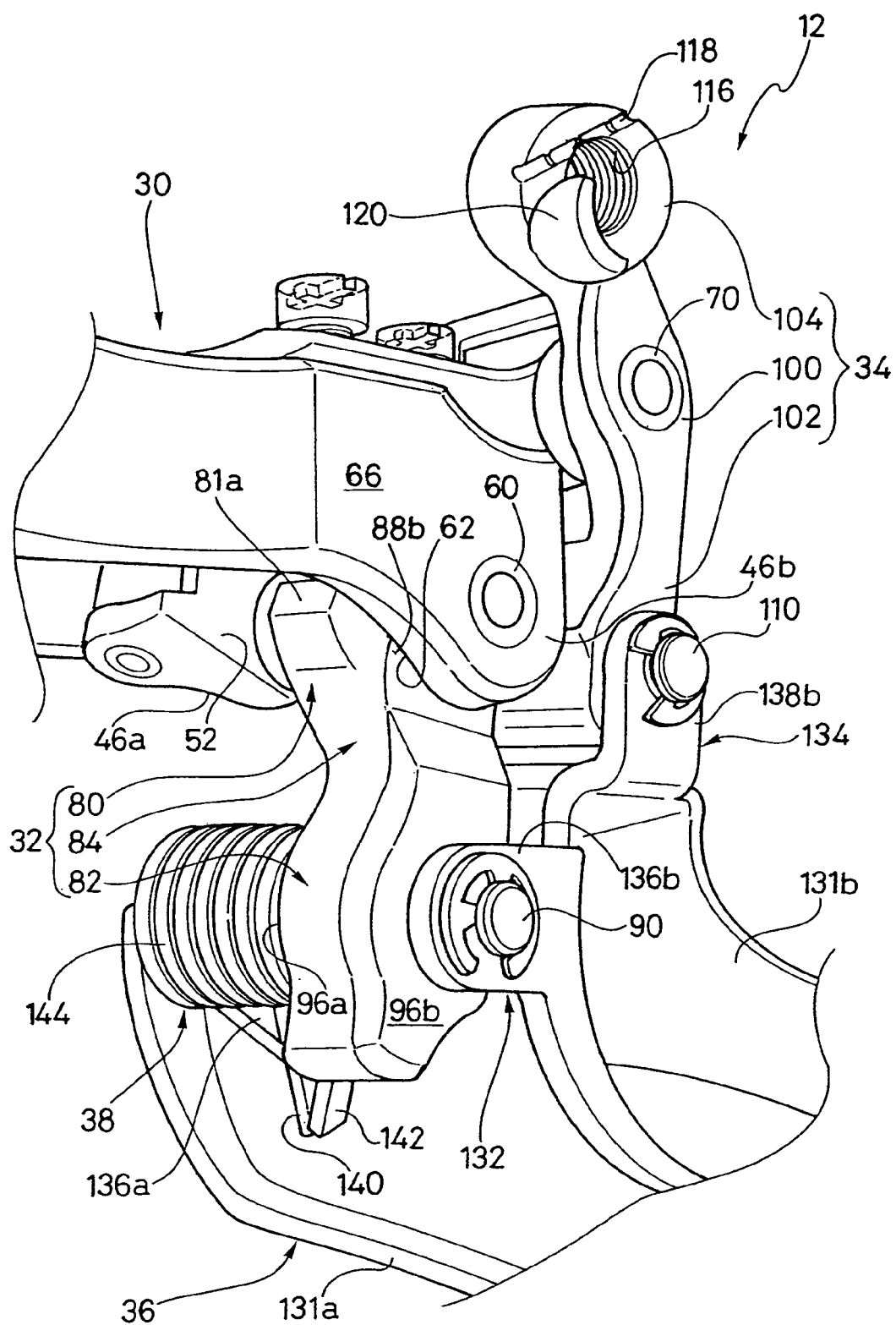
FIG. 12 is an enlarged, partial rear/bottom/inside perspective view of the front derailleur of the bicycle illustrated in FIG. 1.

Referring mainly to FIGS. 11 and 12, the biasing member 38 will now be discussed in more detail. The biasing member 38 is preferably a coil spring that is axially mounted on the pivot pin 90 in front of the second coupling portion 82 of the inner link member 32, but rearwardly of the front attachment element 136a of the movable member 36. Thus, the biasing member 38 preferably includes a front end 140, a rear end 142 and a coiled portion 144 extending between the front and rear ends 140 and 142. The rear end 142 preferably extends radially outwardly from the coiled portion 144 and engages the abutment projection 92 of the inner link member 32. On the other hand, the front end 140 preferably extends tangentially outwardly from the coiled portion 144 and engages the inner shift plate 131a of the movable member 36. The front end 140 is also supported by the rearward facing surface of the front attachment element 136a of the movable member 36. Thus, the front end 140 of the biasing member 138 is located in front of the upper coupling portion 80 of the inner link member 32.

Operation of the front derailleur 12 will now be briefly discussed. The front derailleur 12 basically operates in a relatively conventional manner to move the chain guide 130 laterally over the three front sprockets 22a, 22b and 22c to shift the chain 20 therebetween. Accordingly, the operation of the front derailleur 12 will not be discussed and/or illustrated in detail herein.

Basically, when the control cable 18 is pulled via the shift control unit 16, the link members 32 and 34 move/pivot about the pivot axes A and B against the biasing force of the biasing member 38 to move the chain guide 130 laterally away from the center plane P of the bicycle 10. Conversely, when the control cable 18 is released via the shift control unit 16, the link members 32 and 34 move/pivot about the pivot axes A and B due to the biasing force of the biasing member 38 in an opposite direction to move the chain guide 130 laterally toward the center plane P of the bicycle 10. In other words, the movable member 36 is normally biased toward the inner position from the middle and outer positions relative to the center plane P. Thus, the movable member is also normally biased toward the middle position from the outermost position relative to the center plane P.

SECOND EMBODIMENT

Figure 13:
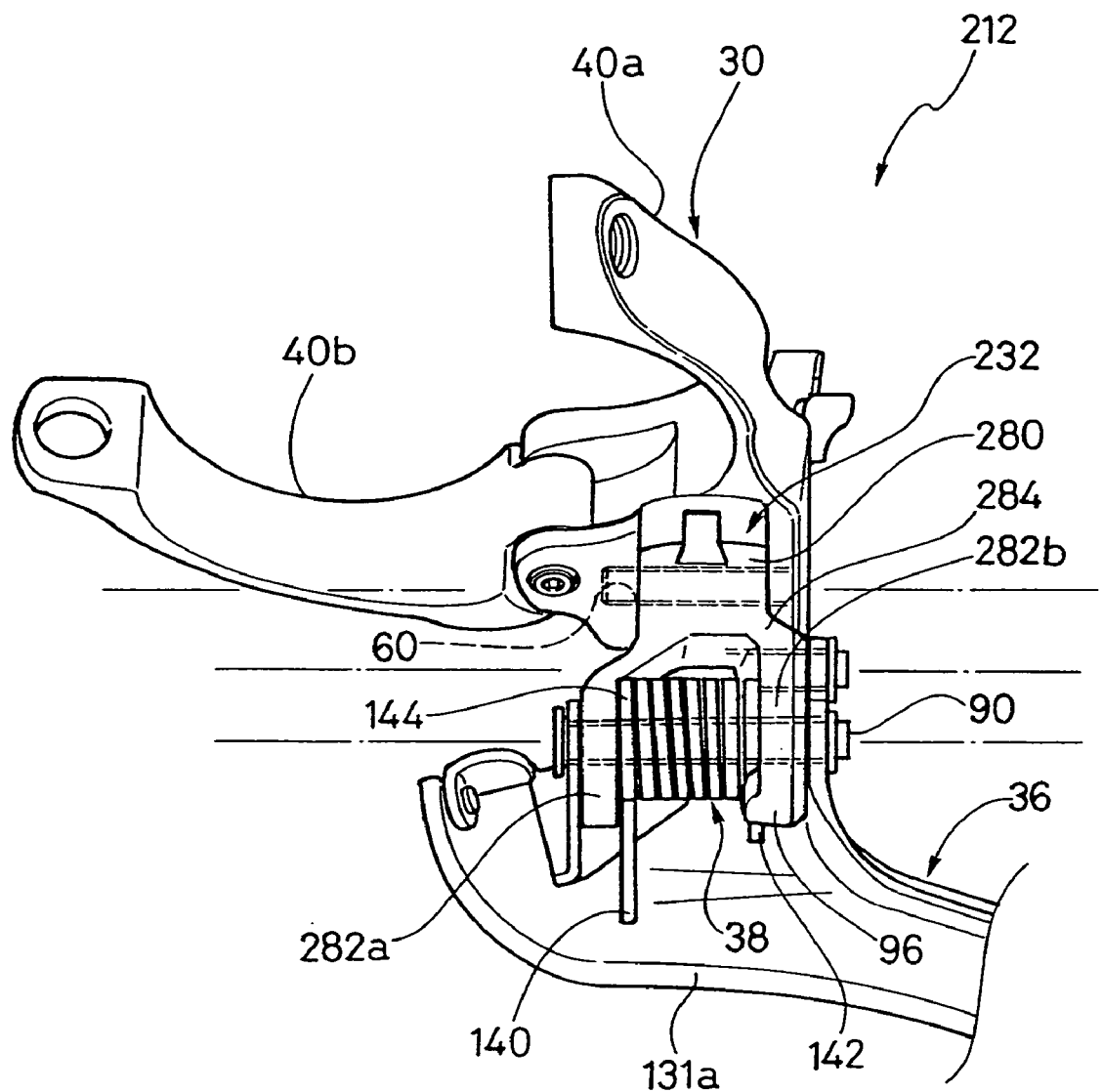
FIG. 13 is an enlarged, partial, bottom/inside perspective view of a front derailleur designed to be used on the bicycle illustrated in FIG. 1 in accordance with a second embodiment of the present invention.

Referring to FIG. 13, a front derailleur 212 in accordance with a second embodiment will now be discussed. The front derailleur 212 is identical to the front derailleur 12 of the first embodiment, except the front derailleur 212 includes a modified inner link member 232 that has a modified shape. Thus, identical parts will be given the same reference numeral in each of the embodiments. The biasing member 38 in this embodiment is identical to the biasing member 38 of the first embodiment. However, the biasing member 38 in this second embodiment is located in a slightly different position relative to the front derailleur 212 due to the arrangement of the modified inner link member 232. In view of the similarities between this second embodiment and the first embodiment, discussed above, this second embodiment will not be discussed and/or illustrated in detail herein. Rather, the following description will focus on the differences between this second embodiment and the first embodiment. Accordingly, it will be apparent to those skilled in the art from this disclosure that the illustrations and descriptions of the front derailleur 12 of the first embodiment also apply to the front derailleur 212 of this second embodiment, except as explained and illustrated herein.

The inner link member 232 of this second embodiment basically includes an upper coupling portion 280, a pair (front and rear) of longitudinally spaced lower coupling portions 282a and 282b and a transitional portion 284 arranged between the upper and lower coupling portions 280 and 282a/282b. The lower coupling portions 282a and 282b are configured to have the biasing member 38 arranged therebetween in this second embodiment. In other words, the inner link member 232 of this second embodiment is identical to the inner link member 32 of the first embodiment, except the inner link member 232 includes two lower coupling portions 282a and 282b instead of the single lower coupling portion 82 of the first embodiment. The inner link member 232 is preferably constructed of a lightweight, rigid material such as metal as a one-piece, unitary member utilizing conventional manufacturing techniques such as casting and/or machining.

The upper coupling portion 280 is pivotally coupled to the base member 30 via the pivot pin 60 in a manner identical to the first embodiment. The upper coupling portion 280 is identical to the upper coupling portion 80 of the first embodiment, except for the connection to the transitional portion 284. In any case, the upper coupling portion 280 functions in a manner identical to the upper coupling portion 80 of the first embodiment. The lower coupling portions 282a and 282b are pivotally coupled to the movable member 36 between the pair (front and rear) of attachment elements 136a and 136b via the pivot pin 90.

The upper coupling portion 280 is wider (thicker) than the each of the lower coupling portions 282a and 282b, and wider (thicker) than the combined width/thickness of the lower coupling portions 282a and 282b together. The lower coupling portions 282a and 282b are offset in the forward and rearward directions, respectively from the upper coupling portion 280 such that the biasing member 38 is at least partially located in front of the upper coupling portion 280 relative to the movable member 36 when the front derailleur 212 is coupled to the seat tube 14 of the bicycle frame 13. The transitional portion 284 has a substantially inverted V-shape with lower ends coupled to the lower coupling portions 282a and 282b. Thus, the transitional portion 284 has a varying thickness.

Preferably, each of the lower coupling portions 282a and 282b is preferably about one-half or only slightly smaller than one-half of the thickness/width of the lower coupling portion 82 of the first embodiment. Thus, the appropriate amount of space between the lower coupling portions 282a and 282b is provided for the biasing member 38 to be arranged between the lower coupling portions 282a and 282b. The lower coupling portion 282b includes an abutment projection 292 identical to the abutment projection 92 of the first embodiment that is configured to engage the biasing member 38 in a manner identical to the first embodiment. Additionally, each of the lower coupling portions 282a and 282b includes a through bore to receive the pivot pin 90.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle front derailleur comprising:
   a base member configured to be coupled to a bicycle frame;
   a movable member having a front end, a rear end and a chain guide portion configured to be moved between first and second positions;
   a first link member including a first coupling portion pivotally coupled to said base member and a second coupling portion pivotally coupled to said movable member about a first pivot axis, said first coupling portion of said first link having a first forward most surface and a first rearward most surface, and said second coupling portion of said first link having a second forward most surface and a second rearward most surface;
   a second link member including a first coupling portion pivotally coupled to said base member and a second coupling portion pivotally coupled to said movable member about a second pivot axis; and
   a biasing member disposed on said first pivot axis to normally bias said movable member to said first position relative to said base member,
   said biasing member being at least partially located in front of said first forward most surface of said first coupling portion of said first link member relative to said movable member when said front derailleur is mounted to the bicycle frame in a normal operating position,
   said second coupling portion of said first link member including a pair of axially spaced mounting elements with said biasing member arranged axially between said mounting elements,
   an overall axial length of said second coupling portion of said first link as measured between said second forward most surface and said second rearward most surface being about 1.5 times an overall axial length of said first coupling portion of said first link as measured between said first forward most surface and said first rearward most surface,
   the normal operating position being defined as a position where said chain guide portion extends longitudinally on a right side of the bicycle frame such that the front end of said movable member is located closer to a handlebar mounting portion of the frame than the rear end of said movable member, said first and second forward most surfaces facing substantially forward toward the handlebar mounting portion of the frame and said first and second rearward most surfaces facing substantially rearwardly away from the handlebar mounting portion of the frame when said front derailleur is mounted to the bicycle frame in the normal operating position.

2. The bicycle front derailleur according to claim 1, wherein
   said biasing member is axially mounted on a first pin that pivotally couples said movable member to said second coupling portion of said first link member.

3. The bicycle front derailleur according to claim 2, wherein
   said biasing member is a coil spring with a first spring end engaged with said movable member and a second spring end engaged with said first link member.

4. The bicycle front derailleur according to claim 3, wherein
   said first spring end is at least partially located in front of said first forward most surface of said first coupling portion and said second spring end is located rearwardly of said first spring end.

5. The bicycle front derailleur according to claim 1, wherein
   said second link member has a cable attachment portion adapted to fixedly couple a cable thereto.

6. The bicycle front derailleur according to claim 5, wherein
   said cable attachment portion of said second link member is located above said first coupling portion of said second link member when said front derailleur is mounted to the bicycle frame in the normal operating position.

7. The bicycle front derailleur according to claim 6, wherein
   said first coupling portion of said second link member includes a pair of axially spaced mounting elements pivotally coupled to axially opposed ends of an attachment element of said base member.

8. The bicycle front derailleur according to claim 1, wherein
   said first coupling portion of said second link member includes a pair of axially spaced mounting elements pivotally coupled to axially opposed ends of an attachment element of said base member.

9. The bicycle front derailleur according to claim 1, wherein
   said movable member includes a pair of axially spaced attachment elements pivotally coupled to said second coupling portion of said first link member.

10. The bicycle front derailleur according to claim 9, wherein
    said movable member includes an additional pair of axially spaced attachment elements pivotally coupled to said second coupling portion of said second link member.

11. The bicycle front derailleur according to claim 1, wherein
    said movable member includes a pair of axially spaced attachment elements pivotally coupled to said second coupling portion of said second link member.

12. The bicycle front derailleur according to claim 1, wherein
    said base member includes a tubular clamping portion.

13. The bicycle front derailleur according to claim 1, wherein
    said base member includes first and second axially spaced attachment elements with said first coupling portion of said first link member pivotally coupled between said first and second attachment elements of said base member.

14. The bicycle front derailleur according to claim 1, wherein
   said first coupling portion of said first link member is located closer to the bicycle frame than said first coupling portion of said second link member when said front derailleur is mounted to the bicycle frame, and
   said second coupling portion of said first link member is located closer to the to the bicycle frame than said second coupling portion of said second link member when said front derailleur is mounted to the bicycle frame.

15. The bicycle front derailleur according to claim 14, wherein
   said second coupling portion of said first link member is located below said first coupling portion of said first link member when said front derailleur is mounted to the bicycle frame, and
   said second coupling portion of said second link member is located below said first coupling portion of said second link member when said front derailleur is mounted to the bicycle frame.

16. The bicycle front derailleur according to claim 1, wherein
   said first link member includes a first transitional portion arranged between said first coupling portion and said second coupling portion of said first link member such that said first coupling portion is at least partially located in front of said second coupling portion of said first link member relative to said base member when said front derailleur is mounted to the bicycle frame.

17. The bicycle front derailleur according to claim 16, wherein
   said second forward most surface of said second coupling portion of said first link member is located in front of said first forward most surface of said first coupling portion of said first link member.

18. The bicycle front derailleur according to claim 1, wherein
   said biasing member has a front end engaging said movable member and a rear end engaging said first link member.

19. The bicycle front derailleur according to claim 18, wherein
   said second link member has a cable attachment portion adapted to fixedly couple a cable thereto.

20. The bicycle front derailleur according to claim 19, wherein
   said first coupling portion of said second link member includes a pair of axially spaced mounting elements pivotally coupled to axially opposed ends of an attachment element of said base member.

* * * * *